(12) United States Patent
Grever

(10) Patent No.: US 6,208,740 B1
(45) Date of Patent: Mar. 27, 2001

(54) STEREOPHONIC MAGNETIC INDUCTION SOUND SYSTEM

(76) Inventor: Karl Grever, 500 S. University, Suite 307, Little Rock, AR (US) 72205

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/889,745

(22) Filed: Jul. 8, 1997

Related U.S. Application Data

(60) Provisional application No. 60/039,559, filed on Feb. 28, 1997.

(51) Int. Cl.[7] .................................................. H04B 5/00
(52) U.S. Cl. ................................................ 381/79; 455/41
(58) Field of Search ........................... 381/79, 80, 81, 381/328, 23.1, 74, 14; 455/41, 100, 129, 95, 97

(56) References Cited

U.S. PATENT DOCUMENTS

| | | |
|---|---|---|
| 2,530,621 | 11/1950 | Lybarger . |
| 3,125,646 | 3/1964 | Lewis . |
| 3,315,375 | 4/1967 | Heinz . |
| 3,598,923 * | 8/1971 | Turner .................................. 381/79 |
| 3,601,550 | 8/1971 | Spracklen . |
| 3,659,056 | 4/1972 | Morrison et al. . |
| 3,742,359 | 6/1973 | Behymer . |
| 3,906,160 | 9/1975 | Nakamura et al. . |
| 4,061,972 | 12/1977 | Burgess . |
| 4,150,262 | 4/1979 | Ono . |
| 4,259,547 | 3/1981 | Valley et al. . |
| 4,334,315 | 6/1982 | Ono et al. . |
| 4,361,733 | 11/1982 | Marutake et al. . |
| 4,472,603 | 9/1984 | Berg . |
| 4,489,330 | 12/1984 | Marutake et al. . |
| 4,508,936 | 4/1985 | Ingalls . |
| 4,685,133 | 8/1987 | Iggulden . |
| 4,723,293 | 2/1988 | Harless . |
| 4,800,884 | 1/1989 | Heide et al. . |
| 4,831,650 | 5/1989 | Grantland . |
| 4,837,832 | 6/1989 | Fanshel . |
| 4,845,751 | 7/1989 | Schwab . |
| 4,902,989 | 2/1990 | Albright . |
| 4,908,869 | 3/1990 | Lederman . |
| 4,918,737 | 4/1990 | Luethi . |
| 5,015,224 | 5/1991 | Maniglia . |
| 5,101,435 | 3/1992 | Carlson . |
| 5,361,306 | 11/1994 | Garcia . |
| 5,371,804 | 12/1994 | Bauer . |
| 5,425,104 * | 6/1995 | Shennib .......................... 381/328 |
| 5,428,688 | 6/1995 | Becker et al. . |
| 5,463,693 | 10/1995 | Birli et al. . |
| 5,771,438 * | 6/1998 | Palermo et al. .................. 455/41 |

* cited by examiner

Primary Examiner—Vivian Chang
(74) Attorney, Agent, or Firm—William C. Crutcher

(57) ABSTRACT

A stereophonic magnetic induction sound system is disclosed which has an audio source, two ear pieces, each having an inductive pick-up coil, and a magnetic induction transmitter connected to the audio source and capable of transmitting different signals to the pick-up coils in the two ear pieces. The transmitter may have two or more antennas, a first conductor for transmitting one signal to one of the antennas, a second conductor for transmitting a different signal to the other antenna, and grounds connected to each antenna. The antennas are comprised of a core with a wires coiled about the core and are shaped and positioned on a user's neck to, at least partially, selectively transmit their respect signals toward a particular, near-by pick-up coil. A connector or stereophonic jack is used to connect the transmitter to an audio source, and a supporting member secures the antennas around a user's neck and restricts movement of the antennas relative to the neck.

7 Claims, 3 Drawing Sheets

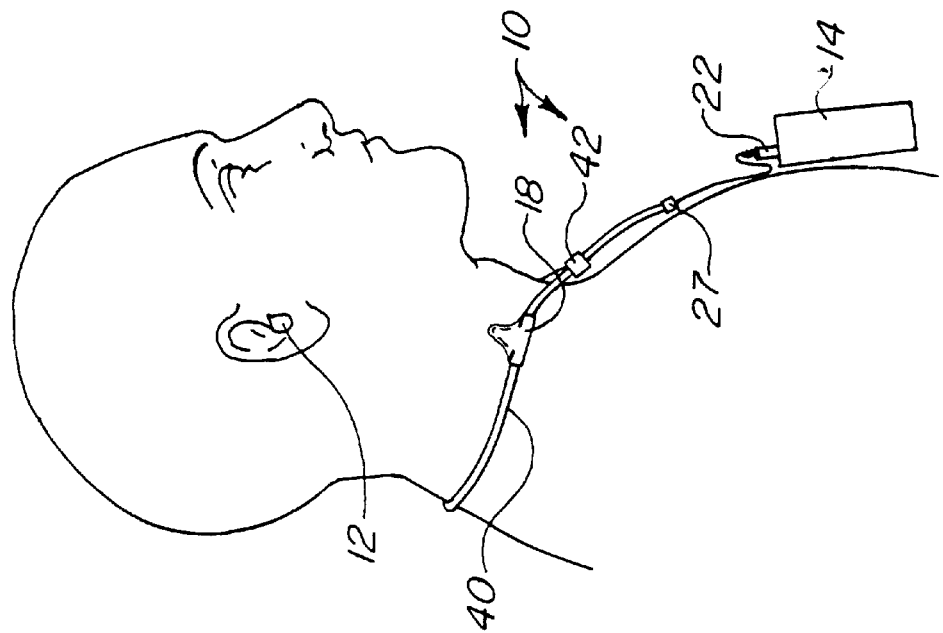
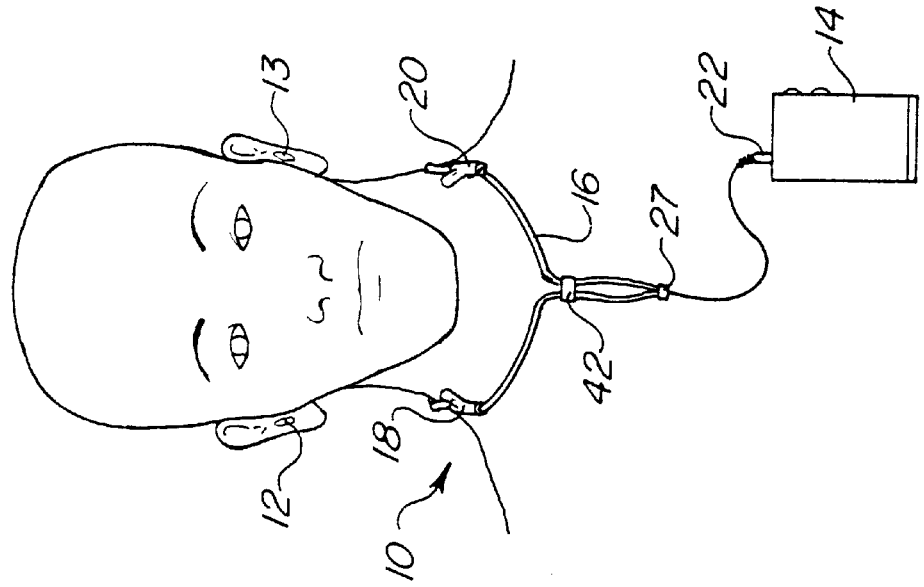

STEREOPHONIC MAGNETIC INDUCTION SOUND SYSTEM

This application is a continuation-in-part of provisional patent application Ser. No. 60/039,559, filed on Feb. 28, 1997.

BACKGROUND OF THE INVENTION

This invention relates to magnetic induction transmitters and sound systems, and more particularly, to portable magnetic induction transmitters and sound systems that use personal magnetic induction transmission transducers.

Monophonic magnetic induction sound systems have been known for some time and have been used for a variety of purposes. In a magnetic induction sound system, output from an audio source such as a microphone or radio receiver is provided to a magnetic induction transmitter, such as a transmitting loop. The transmitter transmits a signal to a magnetic induction pick-up coil, also known as a telephone coil or T-coil, using a fluctuating magnetic field. The signal is received by the pick-up coil and is transmitted to an amplifier or earphone in an ear piece. Magnetic induction pick-up coils have been used in hearing aid devices for some time and were originally used to enable the user to listen to a telephone by inductive pick-up of fluctuating magnetic fields generated by a telephone receiver rather than by using a microphone in the hearing aid. Monophonic magnetic induction sound systems have also been used in classrooms. For example, transmitters, in the form of one or more large loops encircling a classroom or other larger area, have been used to transmit a signal to pick-up coils in ear pieces or hearing aids worn by users in an area encircled by or near the loop or loops. Similarly, individual monophonic magnetic induction sound systems have been disclosed in which a magnetic induction transmitter worn by a user transmits a monophonic signal to one or more pick-up coils worn by a user. A magnetic induction transmitter used in such an individual sound system has typically taken the form of a wire loop draped loosely around the neck of a user, with electricity passing through the loop to generate a fluctuating magnetic field that encircles the head of a user. Alternatively, it has been proposed to attach the magnetic induction transmitter directly to the outer casing of the ear piece. Monophonic magnetic induction sound system have been very beneficial, particularly for use by the hearing impaired, but the sound quality of the systems has been relatively poor.

In the field of high fidelity sound systems, stereophonic headphones have gotten smaller, and "wireless" headphones have been introduced. Nonetheless, headphones or ear pieces still typically require wires to be connected to the ear pieces to transmit the stereophonic signals. Even so-called "wireless" headphones typically use a relatively bulky headset having an external antenna that is hardwired to the ear pieces or ear phones that are secured to the headsets. These wireless headphones typically utilize radio or infrared signals broadcast by a near-by transmitter. Although typical stereophonic headphones provide good sound quality, it is sometimes undesirable to have wires extending between ear pieces and an audio source. Similarly, it is sometimes undesirable to wear bulky headphones. Particularly when engaging in physical activity, it is often difficult to retain such headphones or ear pieces in place. Also, prolonged use of such headphones or ear pieces is typically uncomfortable.

SUMMARY OF THE INVENTION

It is therefore an object of the present invention to provide a magnetic induction sound system that is capable of providing stereophonic sound.

It is a further object of the present invention to provide a system of the above type that combines the advantages of hearing aid technology with the sound quality of high fidelity headphones.

It is a still further object of the present invention to provide a system of the above type in which a simple magnetic induction transmitter may be used to transmit stereophonic signals to magnetic induction pick-up coils in ear pieces.

It is a still further object of the present invention to provide a system of the above type in which a magnetic induction transmitter worn around a user's neck may provide stereophonic signals to pick-up coils worn by a user.

It is a still further object of the present invention to provide a system of the above type in which two or more magnetic induction antennas may be used to transmit different signals to different pick-up coils in ear pieces worn by a user.

It is a still further object of the present invention to provide a system of the above type in which two or more magnetic induction antennas worn about a user's neck may be used to transmit different signals to different pick-up coils in ear pieces worn by a user.

It is a still further object of the present invention to provide a system of the above type in which a magnetic induction transmitter is capable of transmitting a first signal to a first pick-up coil and a different, second signal to a second pick-up coil.

It is a still further object of the present invention to provide a system of the above type in which small, wireless ear pieces placed in the external ear may provide stereophonic sound.

Toward the fulfillment of these and other objects and advantages, the stereophonic magnetic induction sound system of the present invention comprises an audio source, at least two ear pieces, each having a magnetic induction pick-up coil, and a magnetic induction transmitter connected to the audio source and capable of transmitting different signals to the pick-up coils in the two ear pieces. The transmitter may have two or more antennas, a first conductor for transmitting one signal to one of the antennas, a second conductor for transmitting a different signal to the other antenna, and grounds connected to each antenna. The antennas are comprised of a core with a wire coiled about the core and are shaped and positioned on a user's neck to, at least partially, selectively transmit their respective signals toward a particular, near-by pick-up coil. A connector or stereophonic jack is used to connect the transmitter to an audio source, and a supporting member secures the antennas around a user's neck and restricts movement of the antennas relative to the neck.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings, wherein:

FIG. 1 is a front elevation view of a system of the present inventor, worn by a user;

FIG. 2 is a lateral view of a system of the present invention, worn by a user;

DETAILED DESCRIPTION OF THE PREFERRED EMBODIMENT

Figure 3:
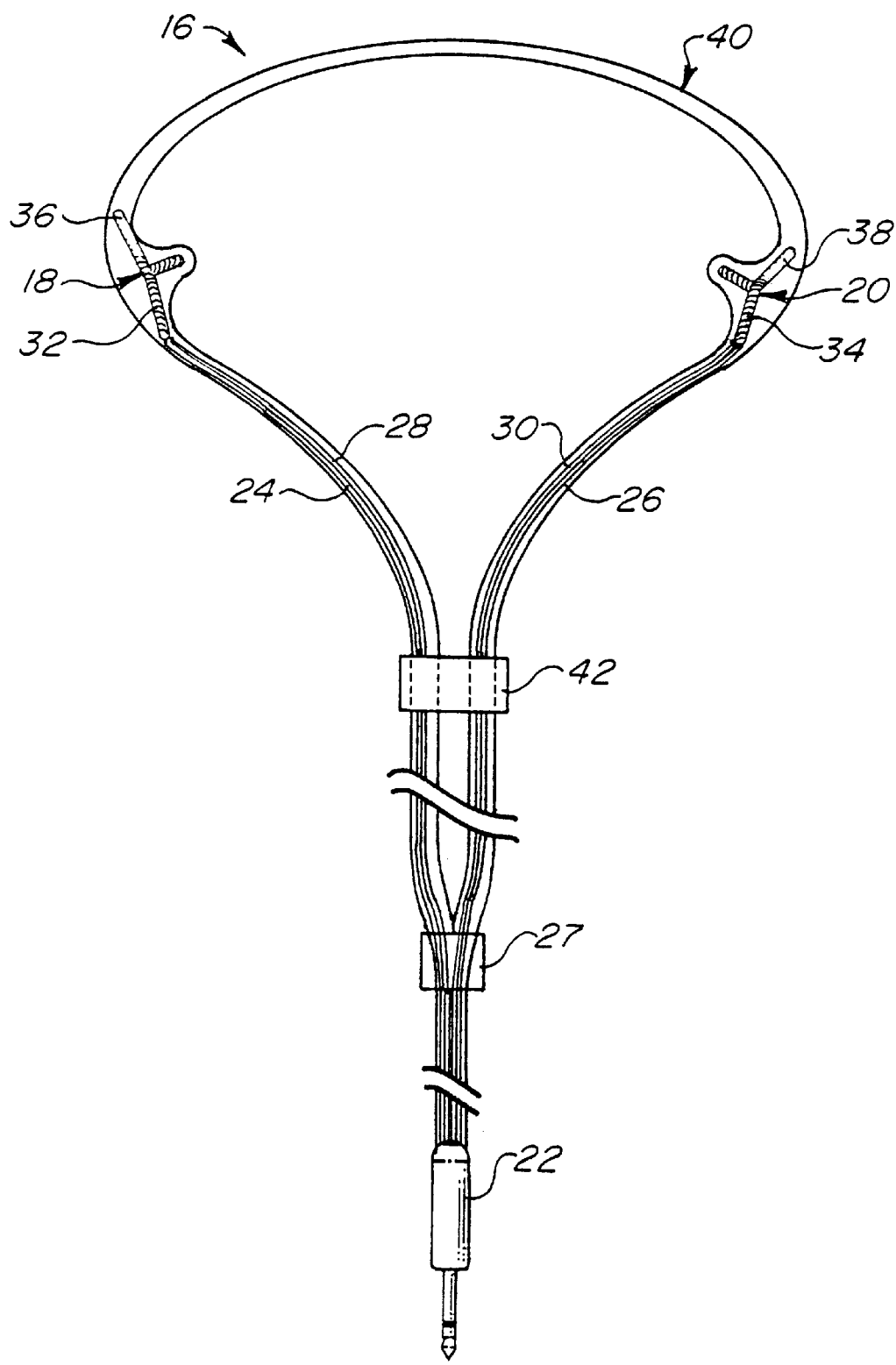
FIG. 3 is an enlarged, partially exploded view of a transmitter of the present invention.

Referring to FIG. 1, the reference numeral 10 refers in general to a stereophonic magnetic induction sound system of the present invention. The sound system 10 has two ear pieces 12 and 13, an audio source 14 and a magnetic induction transmitter 16.

Figure 4:
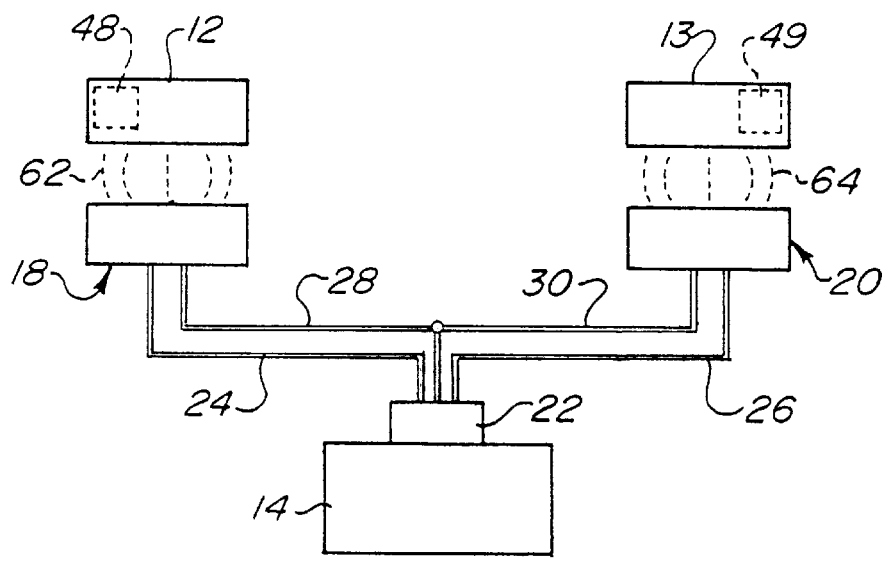
FIG. 4 is a schematic view of a system of the present invention.

As best shown in FIGS. 3 and 4, the transmitter 16 has two magnetic induction antennas 18 and 20, a connector 22, conductors 24 and 26 and grounds 28 and 30 extending between the antennas and connector. The connector 22 is preferably a stereophonic jack capable of receiving separate signals or channels from an audio source 14. A typical stereophonic connector 22 receives one signal at or near its tip and one signal at or near its base, and the connector 22 passes the separate signals to separate conductors or wires 24 and 26 that are soldered or otherwise electrically coupled to the jack. Conductor 24 extends between the connector 22 and antenna 18 for providing a first signal to antenna 18, and conductor 26 extends between the connector 22 and antenna 20 for providing a second signal to antenna 20. Ground 28 extends between the connector 22 and antenna 18, and ground 30 extends between the connector 22 and antenna 20. Conductors 24 and 26 and grounds 28 and 30 exit the connector 22 and pass to a reinforced y-junction 27. As shown in FIG. 4, grounds 28 and 30 may be intertwined or joined over a portion of their lengths between the connector 22 and antennas 18 and 20. In an alternate embodiment, shown in FIG. 3, the grounds 28 and 30 may be separate over their entire lengths. Conductor 24 and ground 28 exit the y-junction 27 and extend to antenna 18, where they are soldered or otherwise connected to opposite end portions of coiled wire 32; conductor 26 and ground 30 exit the y-junction 27 and extend to antenna 20, where they are soldered or otherwise connected to opposite end portions of coiled wire 34. The conductors 24 and 26 and grounds 28 and 30 may be insulated over most of their lengths to better control the direction and shaping of magnetic fields emitted by the transmitter 16.

Each antenna 18 and 20 has an inner core 36 and 38, preferably formed by a malleable material, such as a pipe cleaner, and a wire 32 and 34 coiled about the core. The core is configured as desired to shape and direct a magnetic field toward a desired ear piece 12 or 13. The core 36 or 38 is preferably configured to have three legs or elongate members, joined at their proximal ends. The legs preferably diverge at obtuse angles from adjacent legs, preferably forming an angle of approximately 120° with each adjacent leg. The legs may but need not be arranged to fall within a common plane.

A supporting member 40 connects that antennas 18 and 20 and may encase the antennas and portions of the conductors 24 and 26 and grounds 28 and 30. The supporting member 40 may also extend between the y-junction 27 and antennas 18 and 20 or between the connector 22 and antennas 18 and 20. The supporting member 40 is formed from any number of conventional materials such as rubber, plastic or other insulative tubing and forms a flexible loop that is sized to fit around a neck of a user. Although the preferred supporting member 40 is a flexible loop designed to be worn around a user's neck, the supporting member 40 may take any number of shapes or sizes and may support the antennas 18 and 20 in any number of places on or remote from a user. For reasons to be described, a clasp 42, such as a bolo-type fastener slidably engages portions of the supporting member 40 encasing conductors 24 and 26 and grounds 28 and 30 between the y-junction 27 or the connector 20 and the antennas 18 and 20.

The transmitter 16 may be used in connection with any conventional stereophonic audio source 14, including but not limited to radios, cassette players, compact disc players, and digital audio tape players, portable or not. As long as the connector 22 fits a particular audio source, the audio source should need no modification. Similarly, the transmitter 16 may be used without modification in combination with conventional hearing aids having pick-up coils 48 and 49, as long as the hearing aids are sufficiently sensitive to convert and process the signals being transmitted by the antennas 18 and 20.

Figure 5:
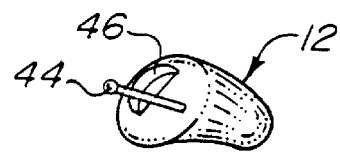
FIG. 5 is a perspective view of an ear piece of the present invention.
Figure 6:
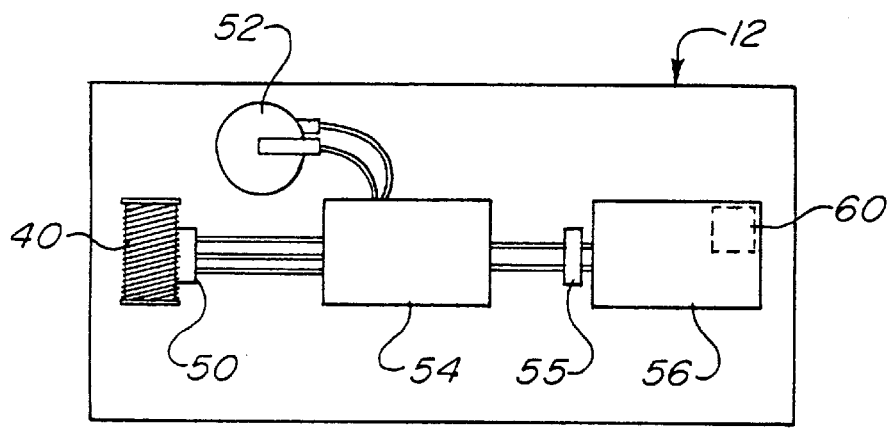
FIG. 6 is a schematic view of an ear piece of the present invention.

An example of a preferred ear piece 12 for use in connection with the system 10 is depicted in FIG. 5. The small ear piece 12 is sized to fit within the external ear or acoustic meatus similar to the manner in which hearing aids are often worn. A typical ear piece 12 has a handle 44 for user convenience and a readily accessible battery compartment 46. As best shown in FIG. 6, a preferred ear piece 12 has a pick-up coil 48 (similarly, ear piece 13 has a pick-up coil 49), with a field effect transistor 50, a battery 52, an amplifier 54, a capactir 55, and a receiver or speaker 56. The receiver 56 is preferably a class D receiver that includes a small amplifier 60. The components of the two ear pieces 12 and 13 are preferably identical. Additional transistors may be used, and any number of configurations may be utilized. It is understood that a pair of conventional hearing aids having pick-up coils may be used in combination with the transmitter 16 to provide stereophonic sound as long as the hearing aid amplifier and other components make the hearing aid sufficiently sensitive to receive, transducer and amplify a signal generated by generated by the transmitter 16. Older hearing aids may have some problems receiving and processing signals of the strength that would typically be generated by a transmitter 16 coupled with an audio source 14 such as a portable radio, cassette player or compact disk player, but a user with hearing aids having newer, improved amplifiers or field effect transmitters should be able to use the transmitter 16 in combination with his or her hearing aids. Of course, the ear pieces 12 and 13 may take any number of shapes and sizes and, as long as they have a means for being inductively coupled with a magnetic induction transmitter 16, may take the form of conventional ear buds or head phones that are supported in, adjacent or near a user's ears.

In operation, a user inserts an ear piece 12 or 13 into each ear and plugs connector 22 into an audio source 14, such as a personal radio, cassette player, compact disc player or digital audio tape player. The user places the supporting member 40 over his head and around his neck and positions the antennas 18 and 20 on his neck under ear pieces 12 and 13, respectively, so that a leg of each antenna is disposed substantially vertically. The user slides the clasp 42 upward toward the neck to hold the supporting member 40 and antennas 18 and 20 against the neck so that the supporting member 40 restricts movement of the antennas 18 and 20 relative to the neck, which in turn restricts movement of antennas 18 and 20 relative to the pick-up coils 48 and 49. For clear, uninterrupted reception, the pick-up coils 48 and 49 should ideally be maintained substantially perpendicular to the magnetic fields generated by antennas 18 and 20 respectively, so it is beneficial to maintain a relatively constant distance and position between antenna 18 and pick-up coil 48 and between antenna 20 and pick-up coil 49. The clasp 42 makes this possible by holding the antennas 18 and 20 against the neck and restricting movement of the antennas 18 and 20 relative to the neck.

When the stereophonic audio source 14 is turned on it provides at least two different signals to the connector 22. As the term is used herein, two signals are not "different" if the second signal is merely the first signal that has been phase-shifted, such as might be done to permit a monophonic receiver to receive and process both signals of a stereophonic radio transmission. A first signal passes through conductor 24 to antenna 18, and the other signal passes through conductor 26 to antenna 20. The antenna 18 is inductively coupled with pick-up coil 48 so that, using a fluctuating magnetic field 62, antenna 18 transmits the first signal to pick-up coil 48. Similarly, antenna 20 is inductively coupled with pick-up coil 49 so that, using a fluctuating magnetic field 64, antenna 20 transmits the other signal to pick-up coil 49. The size, shape and position of antenna 18 selectively directs the magnetic field generated by the antenna 18 toward pick-up coil 48, and the size, shape and position of antenna 20 selectively directs the magnetic field generated by antenna 20 toward pick-up coil 49, to provide a minimum amount of crosstalk to provide good separation of the signals being transmitted to the pick-up coils 48 and 49. The pick-up coils 48 and 49 convert and transmit the separate signals, amplified by the field effect transistor 50 and amplifiers 54, to the receivers 56 to provide stereophonic sound to the user.

Other modifications, changes and substitutions are intended in the foregoing, and in some instances, some features of the invention will be employed without a corresponding use of other features. For example, the transmitter 16 need not be worn around a user's neck and need not be worn by the user at all, as long as the antennas 18 and 20 may be positioned sufficiently close to the respective pick-up coils 48 and 49 to be inductively coupled therewith. Also, the transmitter 16 may be used without the clasp 42. Further, the conductors 24 and 26 may be hardwired directly to the audio source 14, eliminating the need for the connector 22. Further still, a remote audio source may be used in combination with a personal receiver positioned on or near the user, and the remote audio source may transmit signals wirelessly to the personal receiver such as using radio or infrared transmissions. Also, the supposing member 40 need not be used. Accordingly, it is appropriate that the appended claims be construed broadly and in a manner consistent with the scope of the invention.

What is claimed is:

1. A stereophonic magnetic induction sound system, comprising:
   a first ear piece having a first inductive pick-up coil,
   a second ear piece having a second inductive pick-up coil, and
   a magnetic induction transmitter capable of transmitting a first signal to said first inductive pick-up coil and a second signal to said second inductive pick-up coil, said first signal being different from said second signal, said magnetic induction transmitter comprising:
      a supporting member comprising a flexible loop sized to fit about a neck of a user and having a frontal depending Y-junction,
      a first magnetic induction antenna disposed on said supporting member sufficiently close to said first pick-up coil to transmit a first signal to be received by said first pick-up coil,
      a second magnetic induction antenna disposed sufficiently close to said second pick-up coil to transmit a second signal to be received by said second pick-up coil,
      a jack;
      a first conductor extending between said jack and said first antenna for transmitting said first signal to said first antenna,
      a second conductor extending between said jack and said second antenna for transmitting said second signal to said second antenna,
      a first ground extending between said first antenna and said jack, and
      a second ground extending between said second antenna and said jack.

2. The system according to claim 1, wherein said first conductor, said second conductor, said first ground and said second ground extend from said Y-junction to said jack, and wherein said jack comprises a stereophonic jack.

3. The system according to claim 1, wherein the first magnetic induction antenna and the second magnetic induction antenna each respectively comprises a core and a wire, said wire being coiled around said core, each said core including at least one elongate member oriented on said supporting member to couple the first and second magnetic induction antennas respectively with the first and second inductive pick-up coils.

4. The system according to claim 1, wherein the first magnetic induction antenna and the second magnetic induction antenna each respectively comprises a core and a wire, said wire being coiled about said core, said core comprising a first elongate member having a proximal end, a second elongate member having a proximal end, and a third elongate member having a proximal end, said proximal ends of said first, second and third elongate members being connected.

5. The system according to claim 1, and further including means for adjusting the size of the flexible loop and restricting movement of the first and second antennas relative to the neck of said user.

6. The transmitter according to claim 5, wherein said restricting means comprises a slidable fastener engaging the supporting member between the Y-junction and the first and second antennas.

7. The transmitter according to claim 1, wherein the supporting member comprises a tube enclosing portions of the first and second conductors and first and second grounds therein.

* * * * *